United States Patent
Tomizawa (10) Patent No.: US 8,000,396 B2
(45) Date of Patent: Aug. 16, 2011

(54) FILTERING APPARATUS, DIGITAL BROADCAST RECEIVING APPARATUS AND FILTERING METHOD

(75) Inventor: Kenji Tomizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1604 days.

(21) Appl. No.: 11/132,388

(22) Filed: May 19, 2005

(65) Prior Publication Data

US 2005/0265337 A1 Dec. 1, 2005

(30) Foreign Application Priority Data

May 20, 2004 (JP) ................. 2004-150671

(51) Int. Cl.
*H04N 7/12* (2006.01)
*H04N 11/02* (2006.01)
*H04N 11/04* (2006.01)
(52) U.S. Cl. ............. 375/240.29; 370/389; 370/392; 725/39; 725/142; 375/350
(58) Field of Classification Search ........... 375/240.26, 375/240.01, 240.29, 350; 370/389, 392; 725/39, 142
See application file for complete search history.

(56) References Cited

U.S. PATENT DOCUMENTS

| 2001/0002907 A1* | 6/2001 | Jeong et al. | 370/392 |
| 2001/0009034 A1* | 7/2001 | Lee | 725/39 |
| 2002/0106018 A1* | 8/2002 | D'Luna et al. | 375/240.01 |

FOREIGN PATENT DOCUMENTS

| JP | 2000-22747 | 1/2000 |
| JP | 2002-185960 | 6/2002 |
| JP | 2003-51801 | 2/2003 |

OTHER PUBLICATIONS

U.S. Appl. No. 11/476,025, filed Jun. 28, 2006, Tomizawa.

* cited by examiner

*Primary Examiner* — Young Lee
*Assistant Examiner* — James Pontius
(74) *Attorney, Agent, or Firm* — Oblon, Spivak, McClelland, Maier & Neustadt, L.L.P.

(57) ABSTRACT

A filtering apparatus which includes first filters assigned first numbers different from each other and which detect packets having a previously specified identifiers. The apparatus includes information registers disposed in correspondence with the first filters and which store a predetermined number of bits, and includes a condition storage portion that stores second numbers different from each other and section conditions associated with the second numbers. The apparatus includes a determination portion that determines a number range specifying a part of the second numbers for each first filter as not overlapping each other based on the first numbers of each first filter and selects a second number from each number range per first filter based on values of bits in each information register, and a second filter that checks whether the packet detected by each first filter satisfies the section condition associated with the second number determined for each first filter.

20 Claims, 9 Drawing Sheets

(A) GENERAL EXAMPLE (B) UNCOMMOM EXAMPLE

FIG. 4

| SECTION FILTER NUMBER | n-31 | n-30 | ... | n-1 | n | n+1 | ... | n+31 | n+32 |
|---|---|---|---|---|---|---|---|---|---|
| BIT NUMBER | 0 | 1 | ... | 30 | 31 | 32 | ... | 62 | 63 |
| BIT VALUE | 0 | 0 | ... | 0 | 0 | 0 | ... | 0 | 0 |

(A) GENERAL FORM

| SECTION FILTER NUMBER | 97 | 98 | ... | 127 | 0 | 1 | ... | 31 | 32 |
|---|---|---|---|---|---|---|---|---|---|
| BIT NUMBER | 0 | 1 | ... | 30 | 31 | 32 | ... | 62 | 63 |
| BIT VALUE | 0 | 0 | ... | 0 | 0 | 0 | ... | 0 | 0 |

(B) WHEN n EQUALS 0

| SECTION FILTER NUMBER | 113 | 114 | ... | 15 | 16 | 17 | ... | 47 | 48 |
|---|---|---|---|---|---|---|---|---|---|
| BIT NUMBER | 0 | 1 | ... | 30 | 31 | 32 | ... | 62 | 63 |
| BIT VALUE | 0 | 0 | ... | 0 | 0 | 0 | ... | 0 | 0 |

(C) WHEN n EQUALS 16

FIG. 5

| SECTION FILTER NUMBER | n−31 | n−30 | ... | n−1 | n | n+1 | ... | n+31 | n+32 |
|---|---|---|---|---|---|---|---|---|---|
| BIT NUMBER | 0 | 1 | ... | 30 | 31 | 32 | ... | 62 | 63 |
| BIT VALUE | 0 | 0 | ... | 0 | 0 | 0 | ... | 0 | 0 |

(A) ASCENDING ASSIGNMENT

| SECTION FILTER NUMBER | n+32 | n+31 | ... | n+1 | n | n−1 | ... | n−30 | n−31 |
|---|---|---|---|---|---|---|---|---|---|
| BIT NUMBER | 0 | 1 | ... | 30 | 31 | 32 | ... | 62 | 63 |
| BIT VALUE | 0 | 0 | ... | 0 | 0 | 0 | ... | 0 | 0 |

(B) DESCEDING ASSIGNMENT

BACKGROUND ART

FIG. 9 BACKGROUND ART

FILTERING APPARATUS, DIGITAL BROADCAST RECEIVING APPARATUS AND FILTERING METHOD

CROSS-REFERENCE TO RELATED APPLICATIONS

This application claims the benefit of priority under 35USC §119 to Japanese Patent Application No. 2004-150671 filed on May 20, 2004, the entire contents of which are incorporated herein by reference.

BACKGROUND OF THE INVENTION

1. Field of the Invention

The present invention relates to a filtering apparatus, a digital broadcast receiving apparatus and a filtering method applied to, for example, a digital television, a hard disk picture recording device and the like.

2. Related Art

In processing for decoding a transport stream (TS) packet specified by MPEG 2, which is used mainly in digital broadcasting, processing called filtering (PID filtering and section filtering) is required. This will be described in detail below.

The above-mentioned TS packet has a packet structure of 188 bites. The TS packet includes data of voice, video and the like having a PES (packetized elementary stream) format, and SI (service information) or PSI (program specific information) having a section format, as its payload information. An identifier (PID) is allocated to a header of each TS packet, whereby a receiving part (decoding part) can identify what type of data is transmitted by the TS packet.

The above-mentioned SI or PSI (hereinafter referred to as section) is transmitted to the receiving part on a regular schedule for making it possible to acquire media information even if the TS packet is received midway through a program, for example.

The section does not always include same information, and if a change is made to information contents, for example, a history number (version) in a section header, or the like, is changed (e.g. changed from "1" to "2"), whereby the receiving part can determine existence or nonexistence of a change in information.

A TS packet including a plurality of sections may be transmitted by the same PID and in this case, the receiving part can identify each section based on, for example, a table number of the section header or the like. This transmission method is called multi-section transmission and the like.

As can be understood from the above description, in the decoding processing, at least the following filtering is required:

1. filtering for selecting a TS packet by the PID; and
2. filtering for selecting a section if the TS packet selected by the filtering "1" includes the section.

The former is called PID filtering and the latter is called section filtering.

Which PID, with which a TS packet including a section is transmitted, is previously specified by the MPEG standard or broadcasting standard (ARIB in Japan). Namely, which packet selected by PID filtering, for which section filtering is required, is know by the receiving part in advance.

SUMMARY OF THE INVENTION

According to a first aspect of the present invention, there is provided a filtering apparatus comprising: one or more first filters each assigned a first number and detecting a packet having a previously specified identifier; one or more registers disposed in correspondence with the first filters and storing a predetermined number of bits; a condition storage portion storing one or more section conditions each assigned a second number; a determination portion determining a number of the section condition based on the number of the first filter which detected the packet and bit values in the register corresponding to the first filter; and a second filter determining whether all or part of the packet detected by the first filter satisfies the section condition having the number determined by the determination portion.

According to a second aspect of the present invention, there is provided a digital broadcast receiving apparatus comprising: a demodulator subjecting received stream data to demodulation processing and outputting a packet; one or more first filters each assigned a first number and detecting a packet having a previously specified identifier; one or more registers disposed in correspondence with the first filters and storing a predetermined number of bits; a condition storage portion storing one or more section conditions each assigned a second number; a determination portion determining a number of the section condition based on the number of the first filter which detected the packet and bit values in the register corresponding to the first filter; a second filter determining whether all or part of the packet detected by the first filter satisfies the section condition having the number determined by the determination portion; and a processor performing processing using all or part of the packet satisfying the section condition.

According to a third aspect of the present invention, there is provided a filtering method comprising: subjecting received stream data to demodulation processing to output a packet; inputting the output packet to one or more first filters each assigned a first number and specified previously a identify of a packet to be detected; outputting a bit string from a register corresponding the first filter which detected the packet; determining a number of a section condition based on the number of the first filter which detected the packet and the bit string output from the register; outputting a section condition having the determined number from a condition storage portion storing one or more section conditions each assigned a second number; and determining whether all or part of the packet detected by the first filter satisfies the output section condition.

DETAILED DESCRIPTION OF THE PREFERRED EMBODIMENTS

PID filtering and section filtering implemented by a filtering apparatus before the present invention is made will be described before explaining this embodiment.

Figure 8:
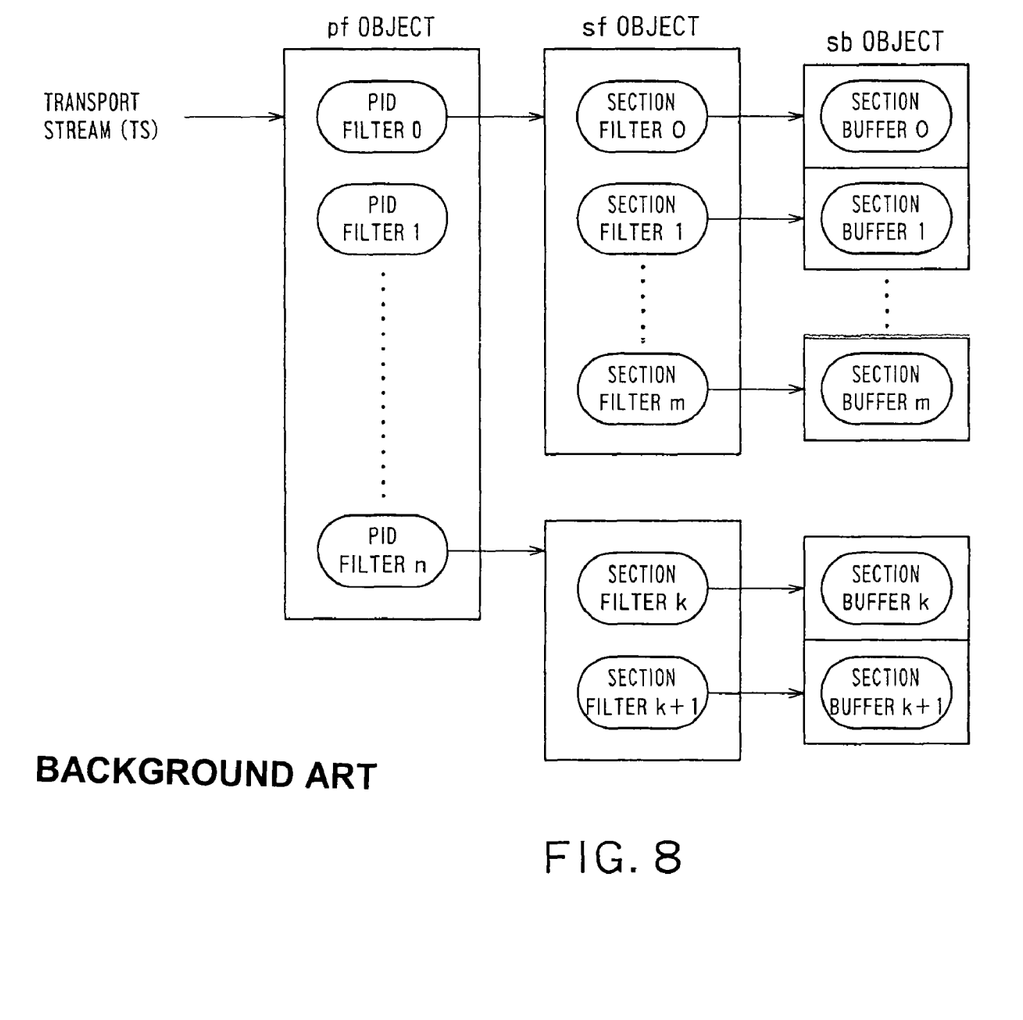
FIG. 8 schematically shows a process flow of PID and section filtering implemented by a filtering apparatus before the present invention is made.

FIG. 8 schematically shows a process flow of general PID filtering and section filtering by the filtering apparatus. Processing for extracting a section in the decoding process will be described using FIG. 8.

In FIG. 8, entities surrounded by circles are processing mechanisms to which data is input/output, and here PID filters 0 to n, section filters 0 to m, k, k+1 and section buffers 0 to m, k, k+1 are shown.

The PID filters 0 to n each compare a previously specified PID value with a PID value possessed by an input TS packet, and extracts a required data part (entire TS packet or part remaining after removal of a header and the like (part of TS packet)) and outputs the same to section filters in the subsequent stage if both the PID values coincide with each other.

In FIG. 8, a set of processing mechanisms to which same data is input is surrounded by a rectangle. For the sake of convenience, the rectangle is called an object. As shown in FIG. 8, three types of objects, i.e. PID filter object (pf object), section filter object (sf object) and section buffer object (sb object) exist depending on the type of processing mechanism surrounded by the rectangle.

In the pf object, the same TS packet is input to each of PID filters 0 to n, and if a TS packet having a preset PID value is input, the PID filters 0 to n each extract a required data part (entire TS packet or part of TS packet) from the TS packet and outputs the same.

In the sf object, data extracted by the PID filter 0 is input to the section filters 0 to m, respectively, and only a section having a desired pattern (e.g. desired table number or history number) is extracted in each section filter 0 to m.

In the sb object, the section buffers 0 to m, k, k+1 are disposed in correspondence with the respective section filters 0 to m, k, k+1, and the section buffers 0 to m, k, k+1 receive sections output from the corresponding section filters 0 to m, k, k+1 and accumulate the same.

In the following description, inputting data from a processing mechanism to another processing mechanism will be described as "connecting" in some cases. For example, "connecting the section filter k to the PID filter n" means "inputting data extracted by the PID filter n to the section filter k".

As described above, a desired section can be extracted by subjecting a TS packet or a part of the TS packet extracted by PID filtering to section filtering.

In this way, extraction of sections in digital broadcasting is carried out, but as the number of programs or the amount of contents increases, the number of PID filters and section filters requested to be mounted in a decoder tends to increase.

In the above filtering apparatus, the number of section filters connectable to each PID filter is not limited, i.e. all section filters in the decoder can be connected to each PID filter. Namely, each PID filter can be connected to any (e.g. all) section filters if for example, the section filters are not used by another PID filter. This makes it possible to flexibly cope with broadcast forms.

However, this configuration has a problem such that as the number of mounted PID filters and section filters increases, the circuit size dramatically increases. This will be described in detail below using FIG. 9.

Figure 9:
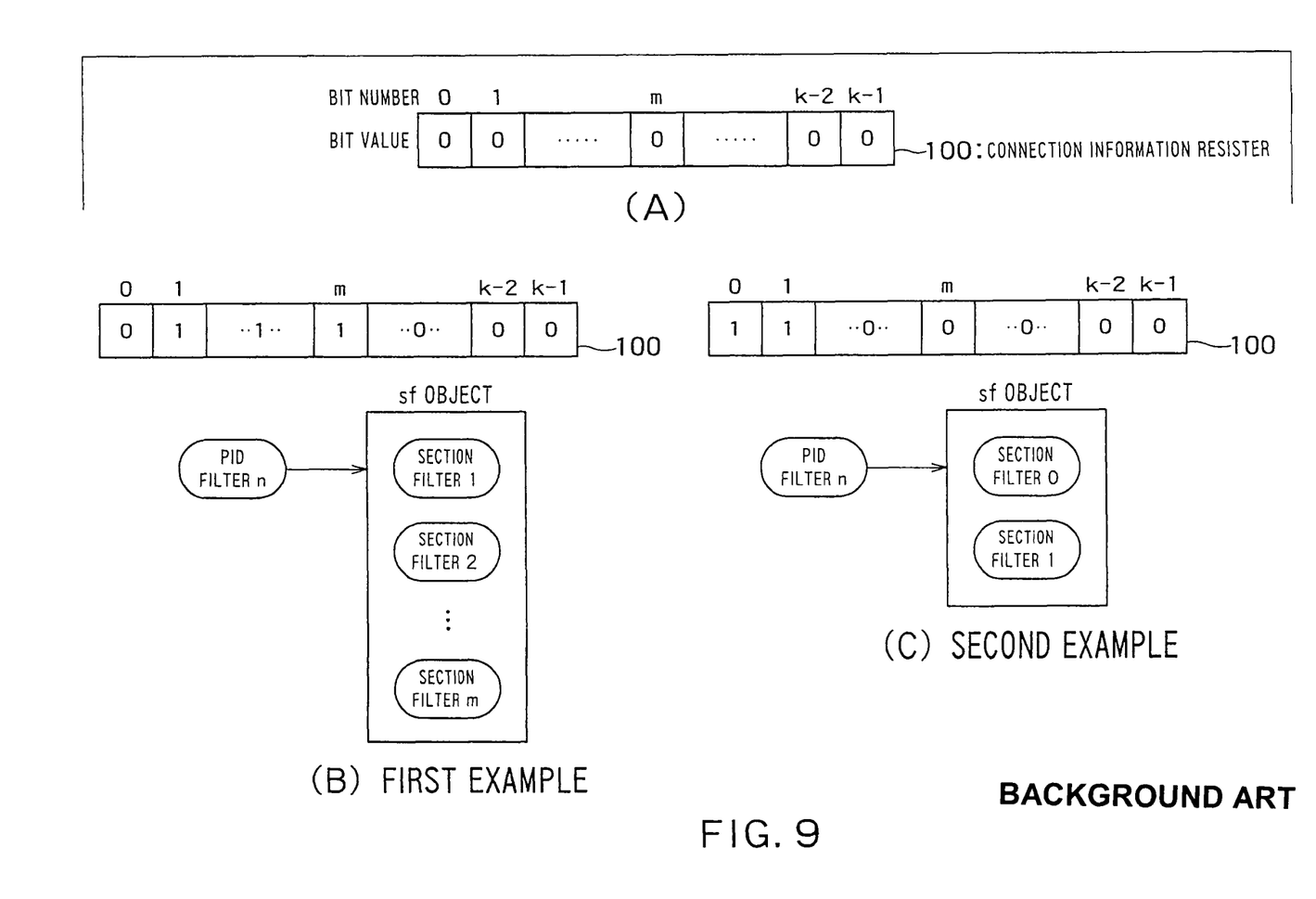
FIG. 9 is a view explaining an example of use of a connection information register in a filtering apparatus before the present invention is made.

FIGS. 9(A) to (C) are views each explaining an example of use of a connection information register in the above filtering apparatus.

The above-mentioned PID filters 0 to n are each assigned the connection information register 100 shown in FIG. 9(A). Bits of a number same as the number of section filters are stored in the connection information register 100. For example, if the number of section filters is k, i.e. 0 to k−1, k bits of information are stored in the connection information register.

A relation of connection between the PID filter and the section filter is determined by a bit value set in the connection information register 100. Namely, the section filter to be connected to the PID filter is determined according to a bit position set to "1" in the connection information register. Specifically, by making a bit having a number corresponding to the number of the section filter have the value of "1" in the connection information register, the section filter having the number is connected to the PID filter.

For example, in the example shown in FIG. 9(B), 1st to mth bits in the connection information register 100 have the value of "1", and therefore section filters 1 to m are connected to the PID filter n.

In the example shown in FIG. 9(C), 0th and 1st bits in the connection information register 100 have the value of "1", and therefore two section filters 0, 1 are connected to the PID filter n.

Owing to the above configuration, any number of section filters and section filters of any numbers can be connected to any PID filter.

In the above configuration, however, if the number of PID filters is n and the number of section filters is k, a register storing total n×k bits is required. For example, a register storing 1024 bits is required if n and k are each 32, a register storing 4096 bits is required if n and k are each 64, and a register storing 16384 bits is required if n and k are each 128. In this configuration, the circuit size dramatically increases as the number of filters increases.

The embodiment of a filtering apparatus that is capable of reducing the circuit size will be described below.

First, how the present inventor has made the present invention will be described.

Generally, a filtering apparatus incorporated in a receiving apparatus that is used in digital television broadcasting or the like flexibly copes with various broadcast forms by:

(1) allowing any number of section filters to be connected to any PID filter; and (2) allowing any section filter to be connected to any PID filter.

However, in this configuration, a problem of causing an increase in circuit size arises as described above.

Thus, the present inventor considered a method capable of inhibiting an increase in circuit size while making it possible to flexibly cope with various broadcast forms. The results of the consideration will be described below.

First, the item (1) will be discussed.

Surely, if a plurality of types of sections (e.g. sections having different table numbers) are transmitted by one TS packet with the same PID value from a sending part (in the case of multi-section transmission), and so on, various broadcast forms can be flexibly coped with to the extent that multiple section filters can be connected to one PID filter.

However, the ARIB standard which should be followed in digital broadcasting in Japan stipulates that the number of types of sections transferable by TS packets of the same PID value should be 10 or smaller at the present time, while the DVB standard which should be followed in European digital broadcasting stipulates the number of types of such sections should be 6 or smaller.

From this fact, it can be considered that even if any number of section filters cannot be connected to one PID filter, no problems will arise in practice as long as with a sufficient allowance, for example, about 16 section filters can be connected. Namely, it can be considered that no problems arise even if the number of section filters connectable to the PID filter is reduced compared to the filtering apparatus before the present invention is made.

Generally, for flexibly coping with various broadcast forms, at least one section filter should be connectable to each PID filter provided that all PID filters are used at the same time. Namely, the requirement of "number of PID filters≦number of section filters" is preferably met.

Next, the item (2) will be discussed.

Surely, various broadcast forms can be flexibly coped with if the PID filter can be connected to any section filter, when connection of the section filter to the PID filter increases and decreases chronologically, and so on.

As one example, the case will be considered where the number of sections to be filtered from packets of the same PID value increases as a result from change of a broadcasted program.

Figure 2:
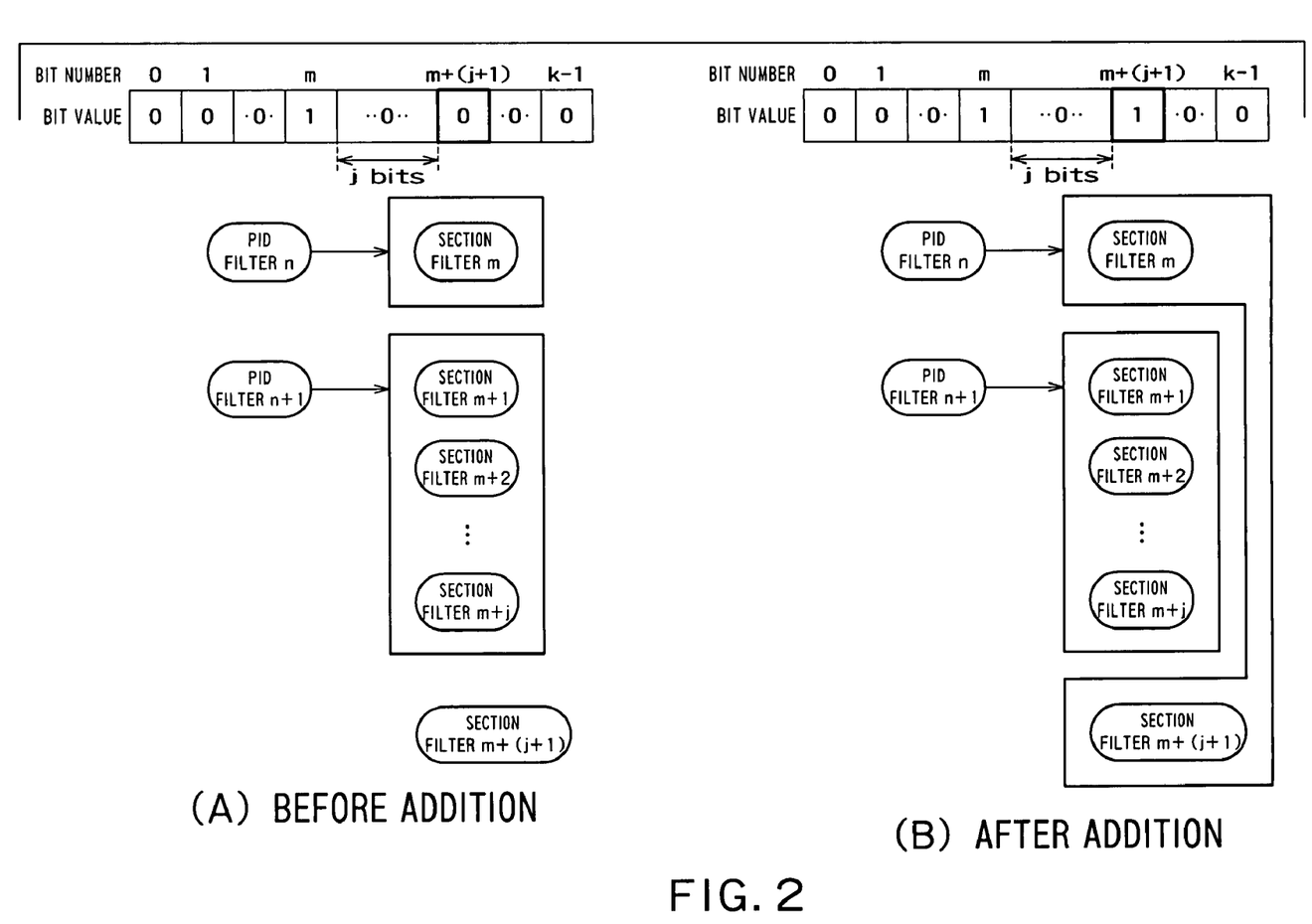
FIG. 2 shows an example in which a section filter to be connected to a PID filter is added.

FIGS. 2(A) and 2(B) show an example in which a section filter to be connected to the PID filter is added. More specifically, FIG. 2(A) shows a state before addition of the section filter, and FIG. 2(B) shows a state after addition of the section filter.

If the PID filter n uses the mth section filter before the changing of the program, then the PID filter n usually uses a nearby section filter such as, for example, a (m−1)th or (m+1)th section filter after changing of the program, as shown in FIG. 2(A). If those section filters are already used, an available section filter nearest the mth section filter, e.g. the (m+(j+1))th section filter is used as shown in FIG. 2(B), thereby making it possible to cope with changing of the program.

Therefore, if the range of section filters connectable to the PID filter n is limited, and all section filters in that range are being used, a section filter connectable to the PID filter does not exist, and therefore the receiving apparatus cannot filter a new section. From this fact it can be considered that if the range of section filters connectable to the PID filter is narrowed too much, a problem of being incapable of coping with various broadcast forms may arise.

However, since the number of section filters increasing or decreasing at a time is often, for example, 2 to 3 at most, and the number of section filters required for one PID filter is usually somewhat fixed as can be understood from the description of (1), it can be considered that no problems arise even if the range of section filters connectable to the PID filter is somewhat narrowed.

Under the consideration described above, the inventor has understood that the circuit size can be reduced without impairing flexibility for coping with various broadcast forms by imposing the limitation shown in Formula 1 on the number k of the section filter connectable to the PID filter of any number n.

$$n-i<k<n+j \quad \text{(Formula 1)}$$

In Formula 1, i and j are values specifying the capacity of a connection information register. The value of i may equal the value of j. One or both of two magnitude determination sign "<" in Formula 1 may be "≦" including an equality determination sign.

For making the present invention easily understandable, Formula 1 will be described more in detail below using a specific example.

However, the example shown below is one example, and the present invention is not limited to the following example.

As one example, the total number of PID filters and the total number of section filters are both 128. The values of i and j are both 32, i.e. the connection information register has a capacity of 64 bits (half of the register capacity in the filtering apparatus before the present invention is made). If the above conditions are applied to Formula 1, the following formula is obtained.

$$n-32<k\leq n+32 \quad \text{(Formula 2)}$$

In this Formula 2, "<" on the right side in Formula 1 is replaced by "≦".

Figure 3:
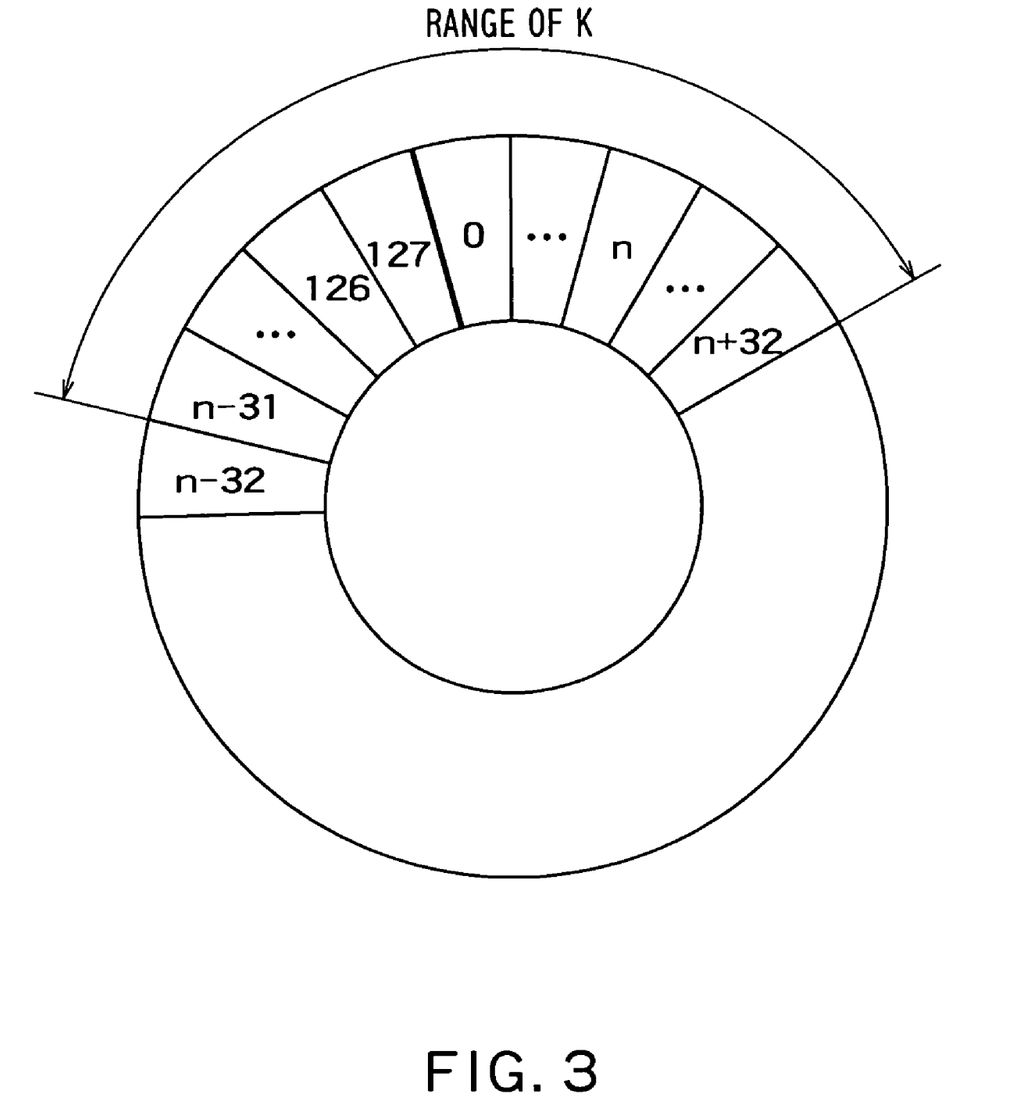
FIG. 3 shows an example of assignment of section filter numbers.

If the PID filter n is identified with an integer of 0 to 127, the left side "n−32" in Formula 2 may be a negative number but in this case, there is no problem if considering that there is continuity between both ends of section filter numbers (0th and 127th numbers in this case) as shown in FIG. 3.

Namely, if the left side "n−32" is below 0 (minimum value of section filter numbers), the PID filter n, for which the result of calculation of n−32 is a negative number, can be assigned a section filter having a negative number from Formula 2 but in this case, by applying the continuity in FIG. 3, a section filter may be applied starting with the section filter of the section filter number 127 (maximum value of section filter numbers).

For example, the PID filter of n=28 can be assigned section filters (−3, −2, −1) having section filter number below 0, i.e. the minimum value of section filter numbers from Formula 2 but in this case, by applying the continuity shown in FIG. 3, a section filter may be assigned starting with the section filter having the maximum value of section filter numbers (127 in this example).

Namely, section filters of k=125 to 127 and k=0 to 60 can be assigned to the PID filter of n=28.

If Formula 2 is rewritten in consideration of the above description, the following formula is obtained.

in the case of n−32<0, $$0\leq k\leq n+32 \text{ or } (n-32)+128<k<128$$

in the case of n−32≧0, $$n-32<k\leq n+32 \quad \text{(Formula 3)}$$

Similarly, if the right side "n+32" in Formula 2 is greater than 127 (maximum value of section filter numbers), a section filter may be assigned starting with the section filter of the section filter number 0 (minimum value of section filter numbers).

For example, the PID filter of n=98 can be assigned section filters (128, 129, 130) having section filter number greater than 127, i.e. the maximum value of section filter numbers from Formula 2 but in this case, by applying the continuity shown in FIG. 3, a section filter may be assigned starting with the section filter having the minimum value of section filter numbers (0 in this example).

Namely, section filters of k=67 to 127 and k=0 to 2 can be assigned to the PID filter of n=98.

If Formula 2 is rewritten in the above description, the following formula is obtained.

in the case of n+32≧128, $$n-32<k<128 \text{ or } 0\leq k\leq (n+32)-128$$

in the case of n+32<128, $$n-32<k\leq n+32 \quad \text{(Formula 4)}$$

From Formulae 3 and 4, Formula 2 can be written as the following.
in the case of n−32<0, $$0\leq k\leq n+32 \text{ or } (n-32)+128<k<128$$

in the case of n+32≧128, $$n-32<k<128 \text{ or } 0\leq k\leq (n+32)-128$$

in other cases, $$n-32<k\leq n+32 \quad \text{(Formula 5)}$$

According to the above Formulae 2 to 5, 64 section filters are connectable to one PID filter, and it can be said that this is a sufficient number as can be understood from the description of (1). Since the ranges of section filters connectable to the PID filters are different (shifted by bits), the section filter can be assigned efficiently. The range of section filters connectable to the PID filter is limited, but it can be considered that this causes no problem.

For example, consider the case where mutually adjacent 8 PID filters each use 10 section filters.

In this case, provided that the numbers of the PID filters are, for example, 50 to 57, section filters connectable to the PID filter 50 are the 19th to 82nd section filters, section filters connectable to the PID filter 51 are the 20th to 83rd section filters, section filters connectable to the PID filter 52 are the 21st to 84th section filters, section filters connectable to the PID filter 53 are the 22nd to 85th section filters, section filters connectable to the PID filter 54 are the 23rd to 86th section filters, section filters connectable to the PID filter 55 are the 24th to 87th section filters, section filters connectable to the PID filter 56 are the 25th to 88th section filters, and section filters connectable to the PID filter 57 are the 26th to 89th section filters, from Formula 5.

Assume here that the PID filters 50 to 57 are sequentially connected to 10 section filters in ascending order of number.

Namely, the PID filter 50 is connected to the section filters 19 to 28, the PID filter 51 is then connected to the section filters 29 to 38, the PID filter 52 is then connected to the section filters 39 to 48, the PID filter 53 is then connected to the section filters 49 to 58, the PID filter 54 is then connected to the section filters 59 to 68, the PID filter 55 is then connected to the section filters 69 to 78, and the PID filter 56 is then connected to the section filters 79 to 88.

Consequently, the PID filter 57 can be connected to only one section filter 89 because the section filters 26 to 88 of the connectable section filters 26 to 89 are connected by other PID filters 50 to 56 at this time. In the filtering apparatus before the present invention is made, each PID filter can be connected to any section filter, and therefore the PID filter 57 can be connected to other available section filters, e.g. the 90th to 98th section filters.

However, as can be understood from the above description of (1), it can be understood that this is quite uncommon in practice.

Figure 4:
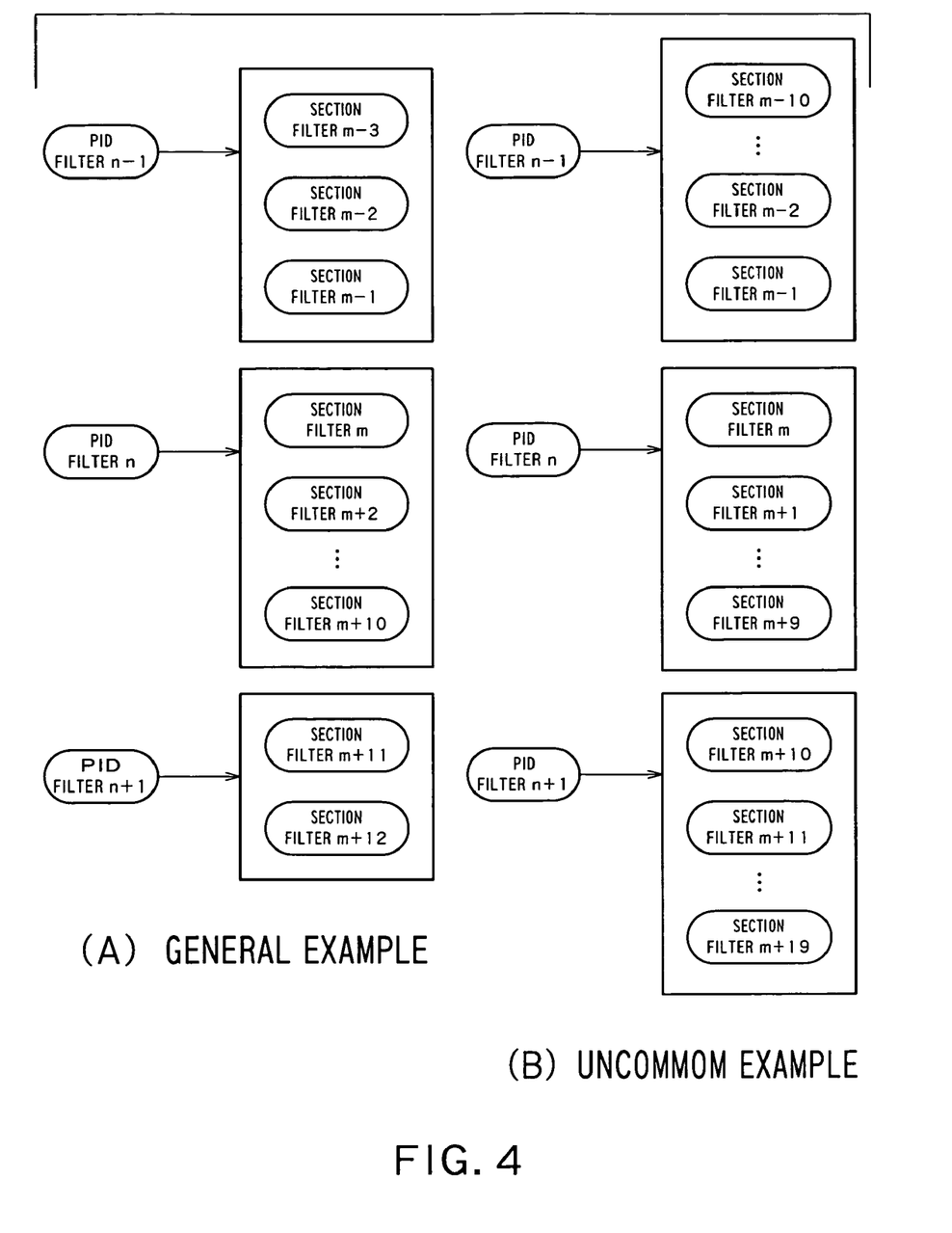
FIG. 4 shows an example of use of the section filter.

Namely, as in FIG. 4(A) showing a general example of use of section filters, if multiple (e.g. 10) section filters m to m+9 are connected to the PID filter n, nearby PID filters n−1, n+1 and the like usually often use a few section filters. As in FIG. 4(B) showing an uncommon example of use of section filters, it is quite uncommon in practice that continuous PID filters each use multiple (e.g. 10) section filters.

Thus, it can be considered that even if the range of section filters connectable to the PID filter is somewhat limited, problems impairing flexibility for various broadcast forms do not arise.

Now, a relation between the range of section filters connectable to the PID filter and the bit value of the connection information register will be described more specifically.

Figure 5:
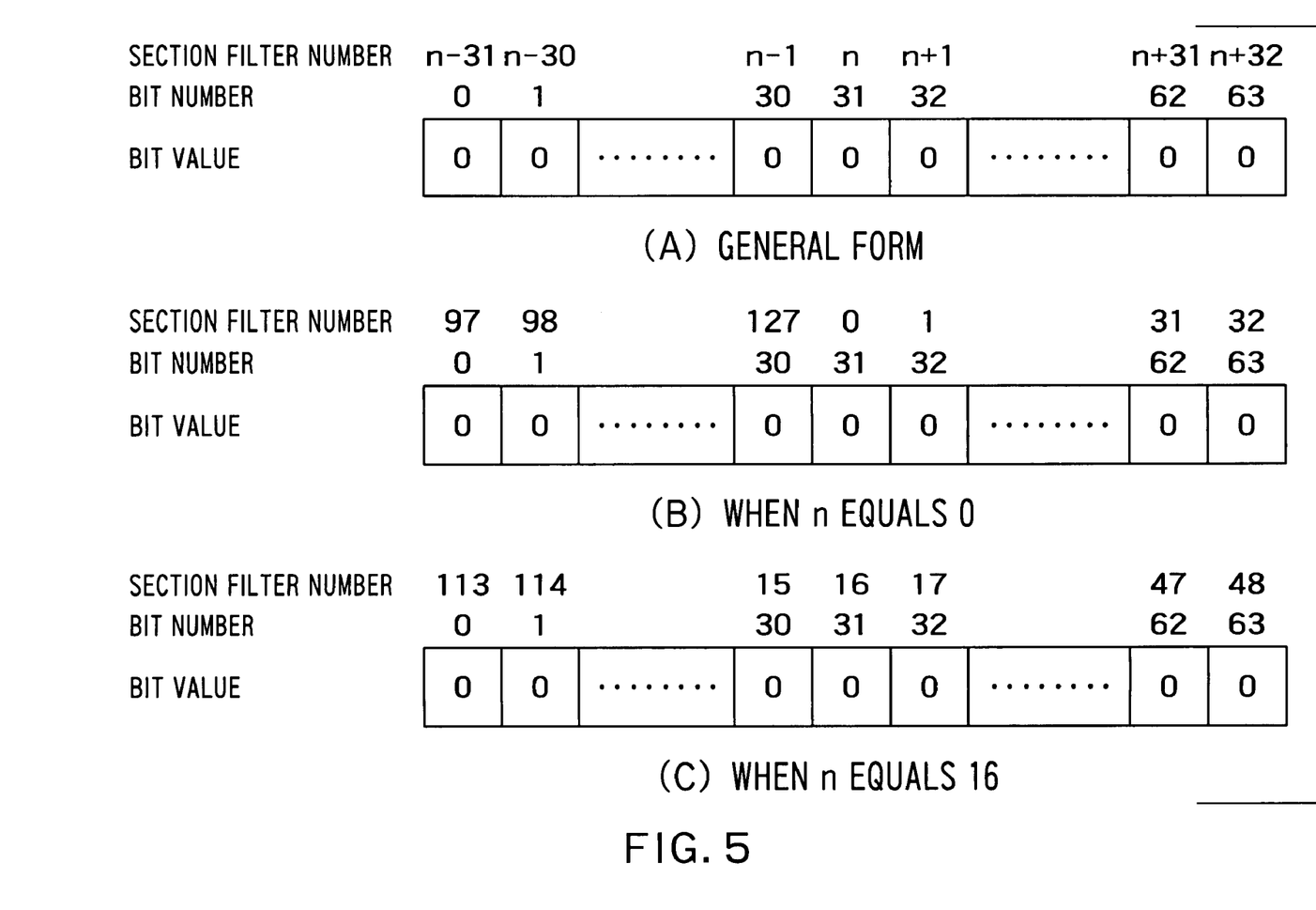
FIG. 5 shows the range of section filters connectable to the PID filter n.

FIG. 5(A) shows the range of section filters connectable to the PID filter n when the connection information register has a capacity of 64 bits, and FIGS. 5(B) and 5(C) show the range of section filters connectable to each PID filter when n equals 0, 16, i.e. the numbers of the PID filter are 0 and 16, in FIG. 5(A).

In the filtering apparatus before the present invention is made, the bit number and the number of the section filter used are made to coincide with each other as described above, but here the section filter number n is made to coincide with the center of bit numbers as shown in FIG. 5(A). Namely, the section filter number identical to the PID filter number is made to coincide with the central bit number. Thus, in FIG. 5(A), if the 31st bit in the connection information register is 1, the nth section filter is connected to the nth PID filter.

For example, if the number n of the PID filter is 0, the range of connectable section filters is fixed to the section filter numbers 97 to 127 and 0 to 32 as shown in FIG. 5(B). Similarly, if the number n of the PID filter is 16, the range of connectable section filters is fixed to the section filter numbers 113 to 127 and 0 to 48 as shown in FIG. 5(C).

Figure 1:
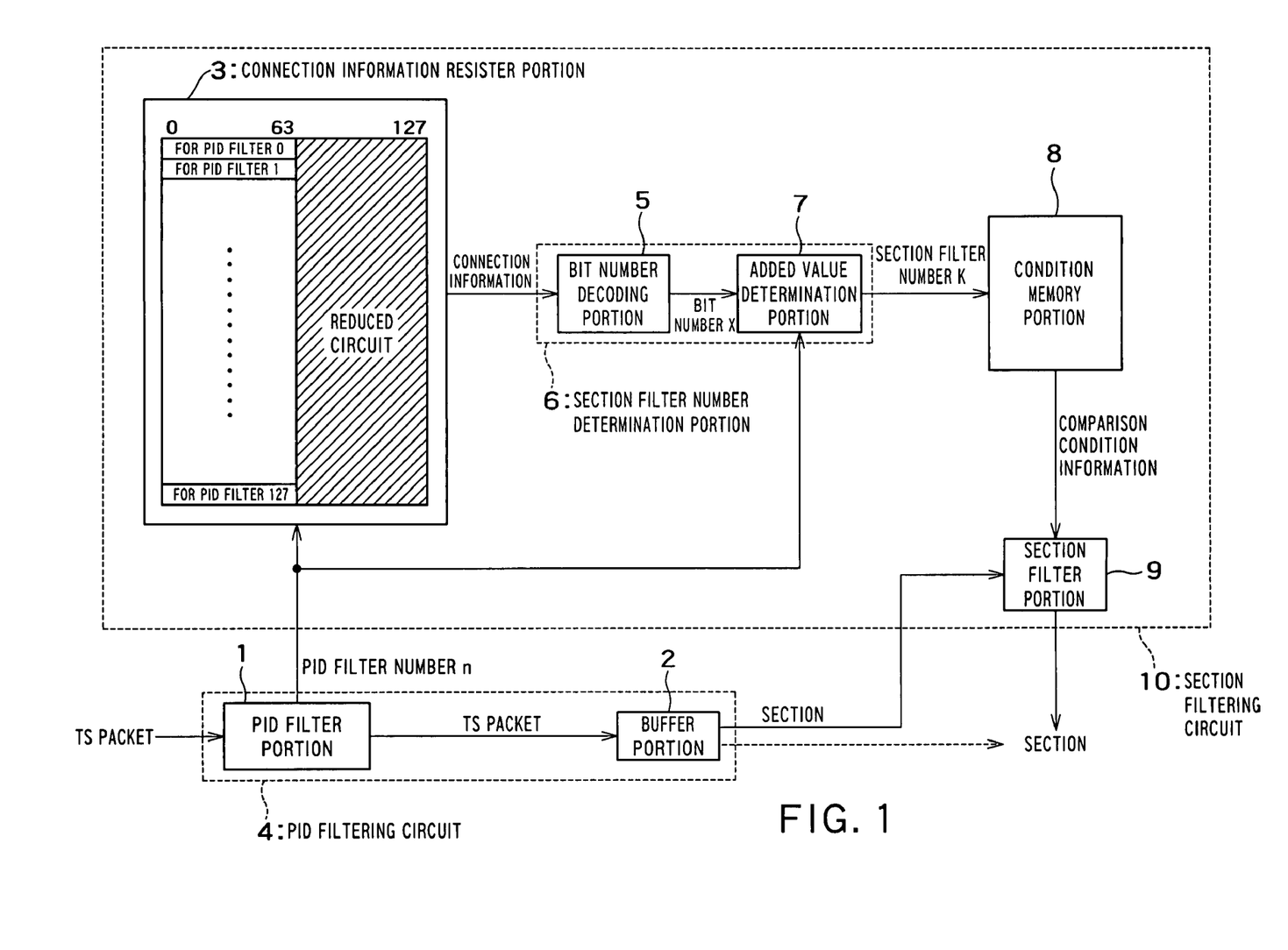
FIG. 1 is a block diagram showing a configuration of a filtering apparatus according to an embodiment of the present invention.

FIG. 1 is a block diagram showing a configuration of a filtering apparatus according to an embodiment of the present invention.

As shown in FIG. 1, a TS packet (including section(s)) after undergoing decoding processing and the like is input to a PID filtering circuit portion 4. The PID filtering portion 4 is comprised of a PID filter portion 1 having a plurality of PID filters 0 to 127 and a buffer 2.

The TS packet input to the PID filtering portion 4 is first input to the PID filter portion 1. PID values are, respectively, set to the PID filters 0 to 127 mounted on the PID filter portion 1. If the PID filter portion 1 detects a TS packet having a PID value identical to the PID value set in at least one of the PID filters 0 to 127, the PID filter portion 1 outputs the TS packet to the buffer portion 2, and outputs the coincident number of the PID filter to a connection information register portion 3 and an added value determination portion 7 in a section filtering circuit 10.

In the buffer portion 2, all or part of the TS packet to be input is output to a section filter portion 9 described later. Here, section(s) as part of the TS packet is output.

In the PID filtering circuit 4 of FIG. 1, the buffer portion 2 is placed in a stage subsequent to the PID filter portion 1, but the present invention is not limited thereto. For example, the TS packet temporarily accumulated in the buffer portion 2 can be subjected to PID filtering by the PID filter portion 1, or the TS packet can be accumulated in the buffer portion 2 while being subjected to PID filtering by the PID filter portion 1. In this way, the present invention does not limit the inner configuration of the PID filtering circuit 4 in FIG. 1 to this embodiment.

The connection information register portion 3 has registers each having a plurality of bits, disposed in correspondence with the PID filters 0 to 127. A storage region of 64 bits is assigned to each PID filter. For the input PID filter number n, the connection information register portion 3 outputs a bit string of 64 bits from the corresponding register. For example, if 0 is input to the connection information register portion 3 as a PID filter number, the connection information register portion 3 outputs a bit string of 64 bits corresponding to the PID filter number 0.

The bit string output from the connection information register portion 3 is input to a section filter number determination portion 6. The section filter number determination portion 6 includes a bit number decoding portion 5 and the added value determination portion 7. The bit string input to the section filter number determination portion 6 is first input to the bit number decoding portion 5.

The bit number decoding portion 5 sequentially identifies the position number x of a bit having the value of "1" from a bit pattern received from the connection information register portion 3, and outputs the identified number x to the added value determination portion 7.

For example, given that the bit string output from the connection information register portion 3 has bit pattern as 0, 0, 1, 0, 1, 1, 0, . . . , and if the value of the position of the ith bit is expressed as x(i), x(2), x(4) and x(5) correspond to bits of "1" when counting from the 0th bit. Thus, in this example, outputs from the bit number decoding portion 5 are 2, 4, 5 . . . .

In the added value determination portion 7, addition of the bit number x to the PID filter number n, i.e. calculation of x+n, is performed. If the section filter number calculated from this value exceeds an allowable range, number conversion using the continuity shown in FIG. 3 is performed. Whether the conversion is performed is determined according to the value of (x+n) as follows.

in the case of x+n<31, $$k=(x+n)+(128-31)=(x+n)+97$$

in the case of x+n≧(128+31), $$k=(x+n)-(128+31)=(x+n)-159$$

in other cases, $$k=(x+n)-31 \quad \text{(Formula 6)}$$

The added value determination portion 7 outputs a value after conversion by Formula 6 to a condition memory portion 8 as the section filter number k.

Corresponding to the section filter numbers 0 to 127, the condition memory portion 8 stores respective bit patterns. The bit pattern includes conditions such as reference data, mask data, etc. This bit pattern, for instance, corresponds a section condition. The section condition includes one or more conditions. The condition memory portion 8 outputs a bit pattern corresponding to the section filter number k input from the added value determination portion 7 to the section filter portion 9 as comparison condition information.

The section filter portion 9 determines whether or not the comparison condition information input from the condition memory portion 8 is satisfied by part or all of the section input from the buffer portion 2.

For example, the section filter portion 9 determines whether or not data obtained as a result of logical multiplication of reference data by mask data or logical addition of reference data to mask data is included in the head of the section. If the section satisfies the comparison condition information, the section filter portion 9 outputs part or all of the section to a subsequent stage block, e.g. a section buffer (see FIG. 8).

As already described, the entire TS packet can be accumulated (stored) in the buffer portion 2, and therefore the section filter portion 9 may output part or all of the TS packet including the section to the subsequent stage block.

Only data to be subjected to filtering (comparison) (e.g. head of section) is output from the buffer portion 2 to the section filter portion 9, and according to the result from the section filter portion 9, part or all of the TS packet, or part or all of the section may be output from the buffer portion 2 directly to the subsequent stage block as extracted data (route described by the dotted arrow in FIG. 1).

Namely, in the present invention, the method and format of transferring (outputting) extracted data to the section buffer in FIG. 8 is not limited to the embodiment in FIG. 1.

Figure 6:
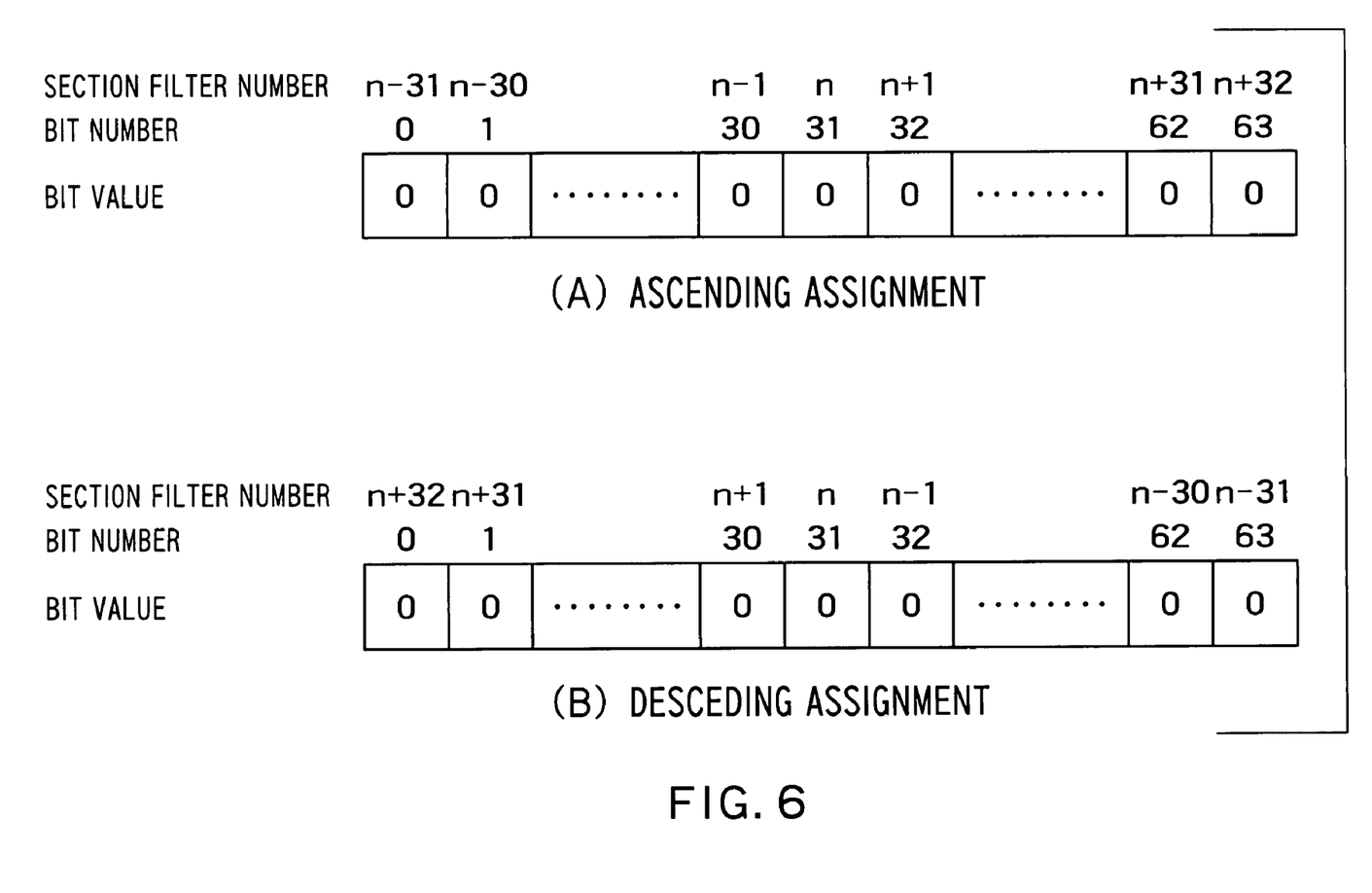
FIG. 6 is a view explaining ascending assignment and descending assignment.

In this embodiment described above, the matching relation between the bit number in the connection information register and the number of the usable section filter is set such that as the bit number in the connection information register becomes higher, the number of the section filter connected becomes higher (ascending assignment) as in FIG. 6(A) (same as FIG. 5(A)). In contrast to this, for example, the matching relation may be set such that as the bit number becomes higher, the number of the section filter connected becomes lower (descending assignment) as shown in FIG. 6(B).

In this embodiment, the number of PID filters and the number of section filters are both 128, and the number of bits of the connection information register assigned to each PID filter is 64, but the present invention is not limited thereto, and these values may be arbitrarily changed according to the design specification.

As described above, according to this embodiment, section filters connectable to the PID filter are determined based on the PID filter number and the bit value in the connection information register, whereby the size of the connection information register can be reduced (to half the size in the filtering apparatus before the present invention is made, in the case of the embodiment of FIG. 1) without impairing flexibility for various broadcast forms. Compared with the filtering apparatus before the present invention is made, the added value determination portion 7 is newly added, but this circuit is small in size, and therefore the area of the circuit can be considerably reduced as a whole.

Figure 7:
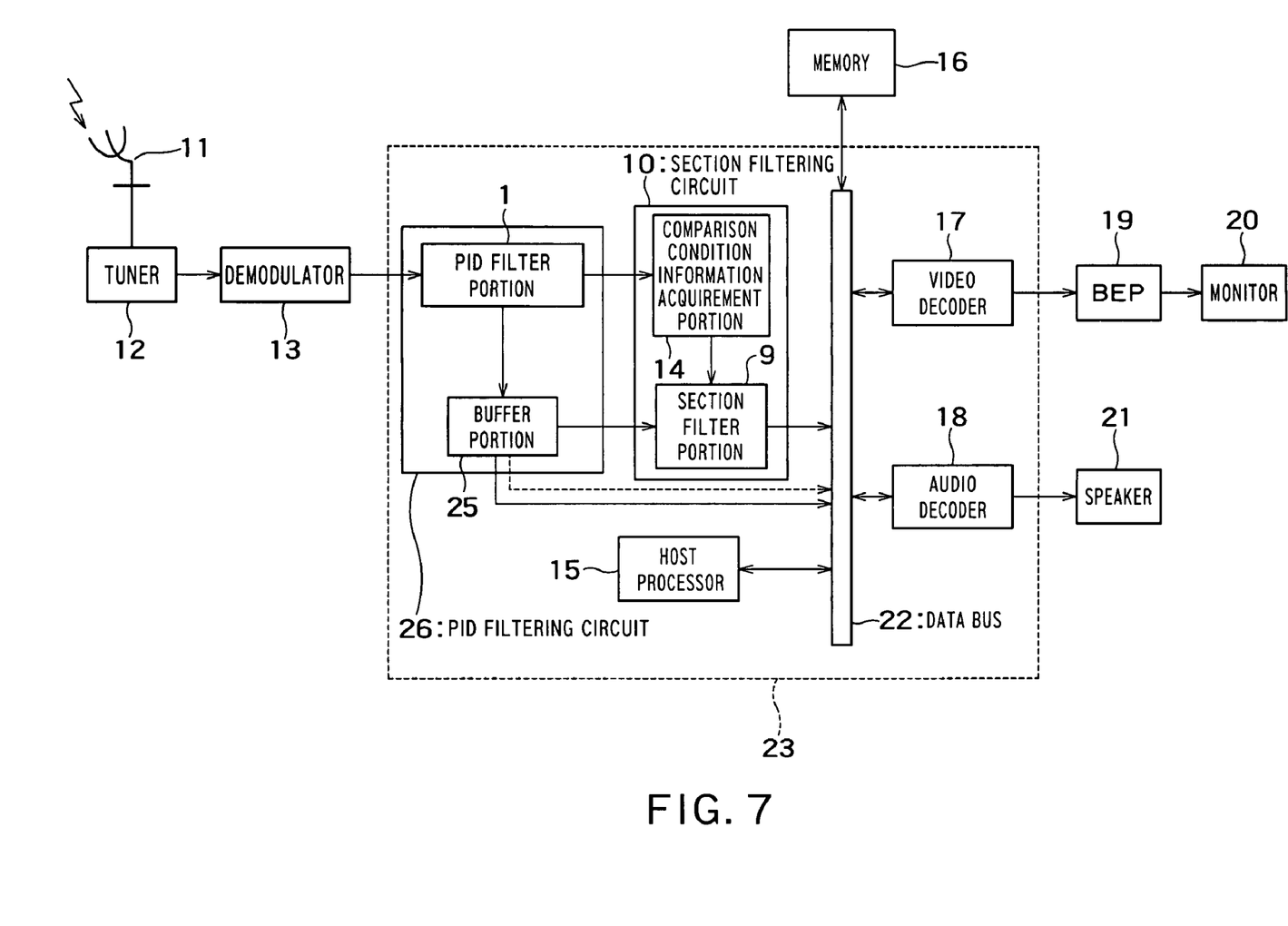
FIG. 7 is a block diagram showing a configuration of a digital broadcast receiving apparatus according to an embodiment of the present invention.

FIG. 7 is a block diagram showing a configuration of a digital broadcast receiving apparatus using the filtering apparatus of FIG. 1. In FIG. 7, same symbols are given to parts equivalent to those shown in FIG. 1.

In FIG. 7, a comparison condition information acquirement portion 14 includes the connection information register portion 3, the bit number decoding portion 5, the added value determination portion 7 and the condition memory portion 8 shown in FIG. 1.

A PID filtering circuit 26, the section filtering circuit 10, a host processor 15, a video decoder 17, an audio decoder 18 and a data bus 22 are formed on a same chip 23.

As shown in FIG. 7, stream data by a radio frequency is input to a tuner 12 via an antenna 11. The tuner 12 converts an input signal of the radio frequency into a base band signal and outputs the signal to a demodulator 13. The demodulator 13 subjects the input base band signal to demodulation processing and outputs the same to the PID filtering circuit 26 as a TS packet. The demodulation processing includes, for example, at least any of conversion from an analog signal to a digital signal, multiplex demodulation if a received signal is modulated in multiple, and otherwise error correction processing and the like.

The PID filtering circuit 26 extracts, from the TS packet including a PID set in advance, desired data constituting all or part thereof and outputs the same to the subsequent stage block.

Subsequent stage blocks include the video decoder 17, the audio decoder 18 and the host processor 15 (which can pass through the section filter portion 9), and in the PID filtering circuit 26, data required (desired) by these subsequent stage blocks is extracted from the TS packet. Data desired by the video decoder 17 is called video data, data desired by the audio decoder 18 is called audio data, and data desired by the host processor 15 is called section data.

In the case of a TS packet including video data or audio data, the TS packet can be discriminated by only a PID, and therefore various kinds of data are acquired by each decoder via a buffer region for each decoder provided in a memory 16 through the data bus 22 from a buffer portion 25.

It is also possible to output data from the buffer portion 25 directly to each decoder without passage through the memory 16 and make each decoder acquire the data.

The video decoder 17 decodes the acquired video data, and outputs resulting image information to a back end processor (BEP) 19. The back end processor 19 subjects the image information to various kinds of image processing such as color correction, and displays the resulting image information at a monitor 20.

The audio decoder 18 decodes the acquired audio data, and regenerates the resulting audio information at a speaker 21.

In the case of a TS packet including section data, the PID filtering circuit 26 outputs the number of the PID filter which has detected the TS packet including the section data to the section filtering circuit 10 as in the embodiment of FIG. 1.

In the section filtering circuit 10, first, a section filter number corresponding to the PID filter number received from the PID filter portion 1 at the comparison condition information acquirement portion 14 is identified, and comparison condition information corresponding to each section filter number is output.

Then, all or part of the TS packet received from the buffer portion 25 at the section filter portion 9, and the above-mentioned comparison condition information are used, and if section data satisfies (or includes) this comparison condition information, the section data is acquired by the host processor 15 via a section buffer provided in the memory 16 through the data bus 22.

At this time, it is also possible to output data from the buffer portion 25 directly to the host processor 15 without passage through the memory 16 and make the host processor 15 acquire the data.

It is also possible to output section data from the buffer portion 25 directly to the data bus 22 (route described by the dotted arrow in FIG. 7) as in the case of data desired by each decoder, instead of outputting section data to the data bus 22 through the section filter portion 9, and the present invention includes this aspect.

As described above, the method of passing data to the subsequent stage block connected to the data bus 22 is not limited in the present invention.

A memory (or register) device in both the memory 16 and the buffer portion 25 are physically same memory, but can be separated logically for use, and the present invention includes this aspect.

The host processor 15 acquires section data, and uses the data-to perform various kinds of processing. For example, if the content of section data is a PMT (Program Map Table) (table in which the PID of media information constituting a program is specified), the host processor 15 sets in the PID filter portion 1 the PID value of a TS packet in which various kinds of information such as visual and audio are multiplexed. If the number of types of section data transmitted by a certain TS packet increases, the bit value in the connection information register corresponding to the PID filter extracting the TS packet is changed, and conditions for extracting section data that is newly identified is set in the condition memory portion 8.

What is claimed is:

1. A filtering apparatus comprising:
    a plurality of first filters assigned first numbers different from each other and configured to detect packets having previously specified identifiers, respectively;
    a plurality of information registers disposed in correspondence with the first filters and configured to store a predetermined number of bits, respectively;
    a condition storage portion configured to store second numbers different from each other and section conditions associated with the second numbers;
    a plurality of second filters each assigned one of the second numbers and configured to connect with respective ones of the plurality of first filters and to check whether the packet detected by a respective first filter satisfies the section condition associated with the appropriate second number determined for the respective first filter; and
    a determination portion configured to determine a number range specifying a part of the second numbers for each first filter as not overlapping each other based on the first numbers of each first filter and select an appropriate second number from each number range per first filter based on values of bits in each information register,
    wherein the predetermined number of bits in each information register is less than the total number of second filters, and each of the plurality of first filters has a predetermined range of the plurality of second filters for which it is allowed to connect to, and the predetermined range for each of the plurality of first filters is different from each other.

2. The filtering apparatus according to claim 1, wherein each bit in the information registers has selection information or non-selection information, and the determination portion selects the appropriate second number according to a position of a bit having the selection information in each information register.

3. The filtering apparatus according to claim 2, wherein the determination portion calculates the appropriate second number by adding a position number of the bit having the selection information to the first number or subtracting the first number from the position number.

4. The filtering apparatus according to claim 3, wherein the determination portion further adds an offset value to an addition result or a subtraction result to calculate the appropriate second number.

5. The filtering apparatus according to claim 4, wherein the determination portion changes the offset value to be added according to the addition result or the subtraction result.

6. The filtering apparatus according to claim 1, wherein a transport stream packet (TS packet) is input into the first filters as the packet.

7. The filtering apparatus according to claim 6, wherein the identifiers are a PID, respectively.

8. The filtering apparatus according to claim 1, wherein the section conditions each include one or more conditions.

9. A digital broadcast receiving apparatus comprising:
a demodulator configured to subject received stream data to demodulation processing and output a packet;
a plurality of first filters assigned first numbers different from each other and configured to detect packets having previously specified identifiers, respectively;
a plurality of information registers disposed in correspondence with the first filters and configured to store a predetermined number of bits, respectively;
a condition storage portion configured to store second numbers different from each other and section conditions associated with the second numbers;
a plurality of second filters each assigned one of the second numbers and configured to connect with respective ones of the plurality of first filters and to check whether the packet detected by a respective first filter satisfies the section condition associated with the appropriate second number determined for the respective first filter; and
a determination portion configured to determine a number range specifying a part of the second numbers for each first filter as not overlapping each other based on the first numbers of each first filter and select an appropriate second number from each number range per first filter based on values of bits in each information register; and
a processor configured to perform processing using the packet satisfying the section condition,
wherein the predetermined number of bits in each information register is less than the total number of second filters, and each of the plurality of first filters has a predetermined range of the plurality of second filters for which it is allowed to connect to, and the predetermined range for each of the plurality of first filters is different from each other.

10. The digital broadcast receiving apparatus according to claim 9, wherein each bit in the information registers has selection information or non-selection information, and the determination portion selects the appropriate second number according to a position of a bit having the selection information in each information register.

11. The digital broadcast receiving apparatus according to claim 10, wherein the determination portion calculates the appropriate second number by adding a position number of the bit having the selection information to the first number or subtracting the first number from the position number.

12. The digital broadcast receiving apparatus according to claim 11, wherein the determination portion further adds an offset value to an addition result or a subtraction result to calculate the appropriate second number.

13. The digital broadcast receiving apparatus according to claim 12, wherein the determination portion changes the offset value to be added according to the addition result or the subtraction result.

14. The digital broadcast receiving apparatus according to claim 9, wherein the demodulator demodulates a transport stream (TS) and outputs a transport stream packet (TS packet).

15. The digital broadcast receiving apparatus according to claim 14, wherein the identifiers are a PID, respectively.

16. The digital broadcast receiving apparatus according to claim 9, wherein the section conditions each include one or more conditions.

17. The digital broadcast receiving apparatus according to claim 9, wherein the processor updates the values of each bit in the information registers.

18. The digital broadcast receiving apparatus according to claim 17, wherein the processor adds a new section condition to the condition storage portion or updates the section condition in the condition storage portion.

19. A filtering method performed by a digital broadcast receiving apparatus, comprising:
subjecting received stream data to demodulation processing to output a packet;
inputting the output packet to a plurality of first filters assigned first numbers different from each other, and detecting, at the first filters, packets having previously specified identifiers, respectively;
outputting a bit string from one of a plurality of information registers corresponding to one of the first filters which has detected the packet, the information registers including a predetermined number of bits, respectively;
determining a number range specifying a part of second numbers for the one of the first filters based on the first number of the one of the first filters as not overlapping a number range determined for another first filter and selecting an appropriate second number from the number range determined for the one of the first filters based on the bit string;
outputting a section condition associated with the appropriate second number from a condition storage portion configured to store the second numbers and section conditions associated with the second numbers; and
determining whether the packet detected by the one of the first filters satisfies the output section condition, wherein a plurality of second filters of the digital broadcast receiving apparatus are each assigned one of the second numbers and are configured to connect with respective ones of the plurality of first filters and to check whether the packet detected by a respective first filter satisfies the section condition associated with the appropriate second number determined for the respective first filter; and
wherein the predetermined number of bits in each information register is less than the total number of second filters, and each of the plurality of first filters has a predetermined range of the plurality of second filters for which it is allowed to connect to, and the predetermined range for each of the plurality of first filters is different from each other.

20. The filtering method according to claim 19, wherein the subjecting the received stream data includes demodulating a transport stream (TS) and outputting a transport stream packet (TS packet).

* * * * *